US009260877B2

(12) United States Patent
Lopez

(10) Patent No.: US 9,260,877 B2
(45) Date of Patent: Feb. 16, 2016

(54) QUICK RELEASE POOL SKIMMER BASKET APPARATUS

(71) Applicant: Pool Patch LLC, Phoenix, AZ (US)

(72) Inventor: Thomas V. Lopez, Phoenix, AZ (US)

(*) Notice: Subject to any disclaimer, the term of this patent is extended or adjusted under 35 U.S.C. 154(b) by 143 days.

(21) Appl. No.: 14/082,110

(22) Filed: Nov. 16, 2013

(65) Prior Publication Data

US 2015/0136678 A1 May 21, 2015

(51) Int. Cl.
*E04H 4/14* (2006.01)
*E04H 4/12* (2006.01)
*B01D 35/00* (2006.01)
*B01D 29/00* (2006.01)
*B01D 29/35* (2006.01)
*B01D 29/94* (2006.01)

(52) U.S. Cl.
CPC .............. *E04H 4/1209* (2013.01); *B01D 29/00* (2013.01); *B01D 29/35* (2013.01); *B01D 29/94* (2013.01); *B01D 35/00* (2013.01); *E04H 4/1272* (2013.01); *E04H 4/14* (2013.01)

(58) Field of Classification Search
CPC ....... E04H 4/1209; E04H 4/1272; E04H 4/14; B01D 29/35; B01D 29/94; B01D 35/00; B01D 29/00
USPC .............. 210/167.1, 167.19, 167.2, 232, 237, 210/238
See application file for complete search history.

(56) References Cited

U.S. PATENT DOCUMENTS

| 5,830,350 | A | 11/1998 | Voss et al. |
| 5,888,386 | A | 3/1999 | Enright et al. |
| 7,374,671 | B2 | 5/2008 | Blake |
| 8,168,065 | B1 | 5/2012 | Gavigan et al. |
| 8,721,881 | B1 * | 5/2014 | Smith ......................... 210/167.1 |
| 8,864,986 | B1 * | 10/2014 | Smith ......................... 210/167.1 |
| 2012/0305462 | A1 | 12/2012 | Vogtner |

FOREIGN PATENT DOCUMENTS

CA          2778019 A1     12/2012
KR     10-2013-0110783 A   10/2013

* cited by examiner

*Primary Examiner* — Fred Prince
(74) *Attorney, Agent, or Firm* — Thomas W. Galvani, P.C.; Thomas W. Galvani

(57) ABSTRACT

A quick release pool skimmer basket apparatus includes a basket having a sidewall, a filter element coupled to the sidewall to move between an open position and a closed position, and a handle extending upwardly from the basket. A trigger in the handle is operatively coupled to the filter element to hold the filter element in the closed position. Activation of the trigger releases the bottom from the closed position to the open position.

21 Claims, 5 Drawing Sheets

QUICK RELEASE POOL SKIMMER BASKET APPARATUS

FIELD OF THE INVENTION

The present invention relates generally to pool equipment, and more particularly to pool skimmer accessories.

BACKGROUND OF THE INVENTION

Most swimming pools have a pool pump and filter assembly to remove debris, both large and small from the pool and to cleanse and purify the pool water, so that swimmers may enjoy a clean, healthy pool. Pool pump and filter assemblies are essential for maintaining a useable pool, and keeping the pool pump and filter assembly clean, free of foreign debris, and working is important.

In many swimming pools, water is drawn off the top surface of the pool water, and also near the bottom of the pool, into piping that communicates the water to the pool pump and filter assembly. A pump in the pool pump and filter assembly spins an impeller to create pressure which draws the water into the pool pump and filter assembly and which returns water to the pool after it has been filtered and cleaned. A filter in the pool pump and filter assembly typically removes very fine particulates from the pool water, but there are several pre-filters which remove larger material before it can reach the pool pump and filter assembly. One pre-filter is disposed just upstream of the pump and prevents debris from entering the impeller of the pump.

Another pre-filter, carried in the pool skimmer assembly, is disposed upstream from the pre-filter for the pump. The pool skimmer assembly routes water from either the top surface of the pool water, the bottom of the pool, or both, into the pool pump and filter assembly. The pool skimmer routes water from the surface of the pool water into the pool pump and filter assembly when the pool water is at a high level. When the pool water is at a low level, the pool skimmer routes water from the bottom of the pool into the pool pump and filter assembly. The pool skimmer is typically fit with a basket that collects debris from the water immediately after being drawn from the pool. The basket generally has large openings and collects large items, such as leaves, sticks, twigs, bugs, feathers, and other similar debris. Various designs and developments have been made with pool skimmer baskets, including baskets that lock into the pool skimmer, baskets with handles, baskets that minimize clogging, and baskets that minimize the destructive effects of cavitation. With all of these designs, the basket eventually fills with debris, becomes clogged, and has to be emptied for the pool pump and filter assembly to operate properly. Unfortunately, most pool skimmer baskets are very difficult to clean, and debris can become stuck in the basket, requiring that the basket be shaken violently, beat against a hard object, or that the pool operator actually use his hand to dig out water-logged debris. The inventor has realized that an improved pool skimmer basket is needed.

SUMMARY OF THE INVENTION

According to the principle of the invention, a pool skimmer basket apparatus includes a basket having a sidewall and bottom pivotally mounted to the sidewall to move between an open position and a closed position. A handle extends upwardly from the basket to above the basket and carries a trigger which is operatively coupled to the bottom. Activation of the trigger releases the bottom from the closed position to the open position. In operation, the basket apparatus is applied to a pool skimmer assembly and collects debris drawn off the surface of the pool water. When the basket apparatus becomes full with debris, the basket apparatus is gripped by the handle, removed from the pool skimmer, and taken over a trash can. The trigger is activated, and the bottom is released, allowing the collected debris to fall out of the basket apparatus.

BRIEF DESCRIPTION OF THE DRAWINGS

Referring to the drawings.

DETAILED DESCRIPTION

Figure 1:
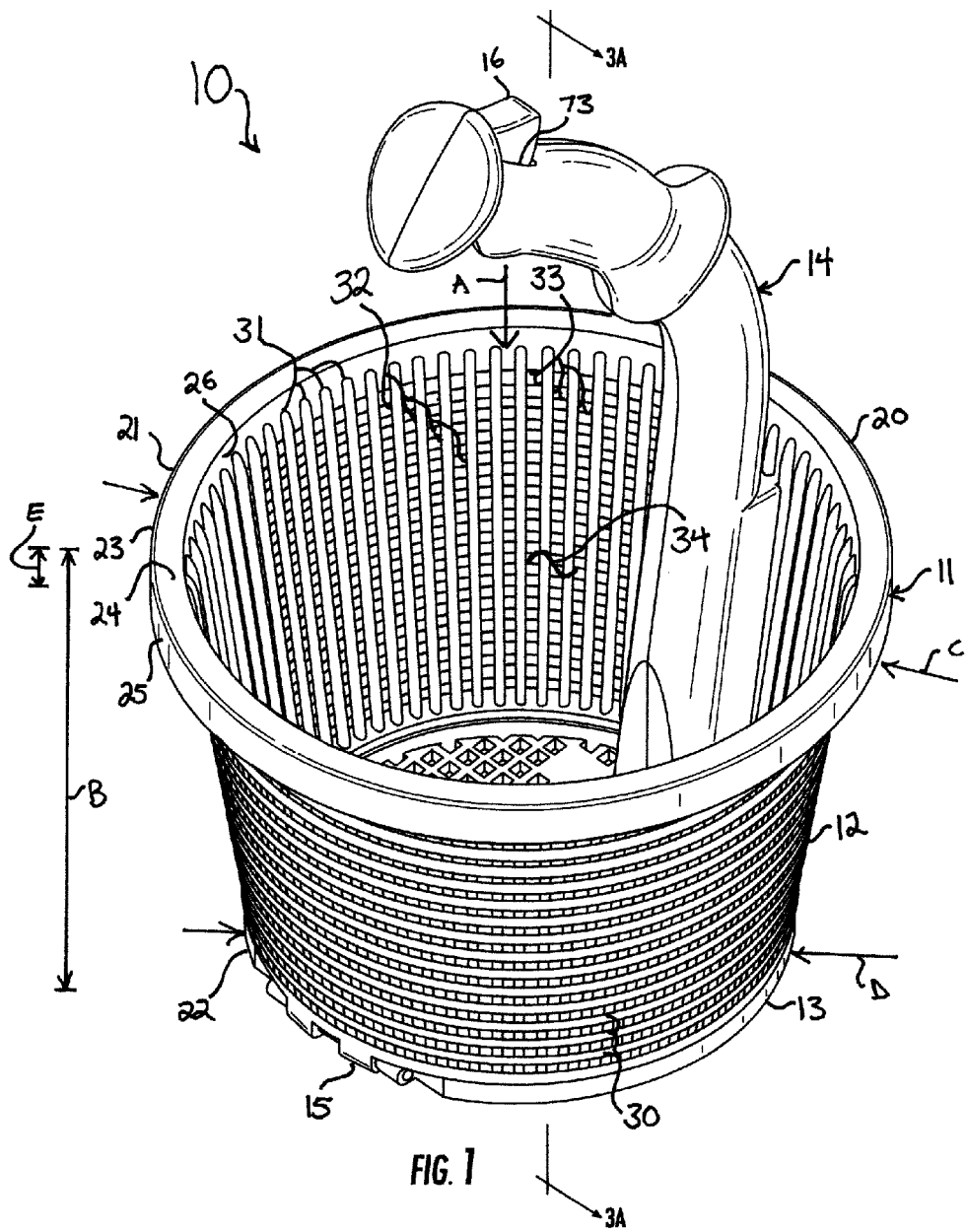
FIG. 1 is a top perspective view of a basket apparatus constructed and arranged in accordance with the principle of the invention, illustrating a basket with a sidewall and a bottom, and a handle extending from the basket.

Reference now is made to the drawings, in which the same reference characters are used throughout the different figures to designate the same elements.

FIG. 1 illustrates a quick release pool skimmer basket apparatus 10 ("basket apparatus 10") constructed and arranged in accordance with the principle of the invention for application and use with a pool skimmer assembly to collect debris before it enters the pool pump and filter assembly. The basket apparatus 10 includes a basket 11 having a sidewall 12 and a bottom 13, and an elongate handle 14 coupled to the basket 11 and extending above the basket 11 so as to be easily grabbed and gripped by hand. The bottom 13 is coupled to the sidewall 12 at a hinge 15 formed between the bottom 13 and the sidewall 12, and the bottom 13 pivots from a closed position to an open position in response to depression of a trigger 16 carried in the handle 14. The basket apparatus 10 is normally applied into a pool skimmer assembly and positioned in a flow of water from the pool to the pool pump and filter, and as water is drawn into the pool skimmer assembly, debris carried in the flow of water is trapped by the basket apparatus 10. When the basket apparatus 10 fills with debris, or when it is desired to clean the debris from the basket apparatus 10, a user grabs the handle 14, removes the basket apparatus 10 from the pool skimmer assembly, and depresses the trigger 16, thereby releasing the bottom 13 into the open position thereof and allowing debris collected in the basket 11 to fall out.

The basket 11 a fluid-pervious receptacle for collecting debris from a flow of water entering the pool pump and filter assembly. The sidewall 12 and bottom 13 cooperate together to filter debris from the water and allow an operator to later remove and deposit the debris elsewhere. The sidewall 12 is formed integrally to a frame 20 of the basket 11. In shape, the frame 20 is generally concave, having an inverted, truncated conical form. The frame 20 has an upstream end 21 and an opposed downstream end 22, and the sidewall 12 extends between the upstream and downstream ends 21 and 22. In operation, the upstream end 21 is positioned at an upstream, or intake, end of the pool skimmer assembly, and the downstream end 22 is positioned downstream from the upstream end 21, so that the flow of water moves through the basket 11 generally along the line indicated in FIG. 1 with the reference character A, representing a flow of water A. The frame 20 has a height B, and a tapered diameter, which includes an upstream diameter C and a downstream diameter D. The upstream diameter C is slightly larger than the downstream diameter D.

Throughout this description, the terms upstream and downstream will be used contextually to describe relative locations. When "upstream" is used to describe the position of an element, the term means that the element is located in a direction from the downstream end 22 to the upstream end 21, and when "downstream" is used to describe the position of an element, the term is means that the element is located in the direction from the upstream end 21 to the downstream end 22. In context, the term "above" may be supplanted for "upstream," and the term "below" may replace "downstream," as each of the figures adopts a vertical view in which the basket apparatus 10 has an upstream end 21-up and downstream end 22-down orientation.

The upstream end 21 of the frame 20 is formed with a rigid, overhanging lip 23 which has a solid, continuous, and annular upper surface 24, a solid, continuous, and annular outer surface 25, and a solid, continuous, and annular inner surface 26 opposed to the outer surface 25. The outer and inner surfaces 25 and 26 each extend away from the upstream end 21 a distance E toward the downstream end 22. Distance E is also considered the height of the lip 23. The sidewall 12 extends downstream from the inner surface 26 of the lip 23. The lip 23 provides rigidity to the frame 20, especially when the flow of water A moves quickly. The lip 23 is an interface with the pool skimmer assembly and supports the frame 20 in the pool skimmer assembly.

Typically, when the basket apparatus 10 is applied to a pool skimmer assembly, the bottom 13 will rest against a bottom of the pool skimmer assembly, and the outer surface 25 of the lip 23 will rest in direct contact with and along an inner surface of the pool skimmer assembly, so that the sidewall 12 is set just off from the inner surface of the pool skimmer assembly.

The sidewall 12 is constructed from a plurality of spaced-apart concentric rings 30 and spaced-apart vertical or longitudinal ribs 31. Each ring 30 overlies each rib 31, and conversely, each rib 31 overlies each ring 30, and where the rings 30 and ribs 31 overlie each other, each ring 30 is fused, adhered, welded, or preferably, integrally formed to the rib 31 in the molding process. In this way, the rings 30 and ribs 31 characterize the sidewall 12 as a strong, rigid mesh of overlaps 32 and holes 33 spacing the overlaps 32 apart. Each of the holes 33 is in communication with an interior 34 of the basket 11 and a space outside of the sidewall 12, so that water may flow along the line A into the interior 34 of the basket 11 and then out of the basket 11 through the holes 33 in the sidewall 12. When the basket apparatus 10 is applied to a pool skimmer assembly, water flowing out of the holes 33 in the sidewall 12 will then flow downstream between the inner surface of the pool skimmer assembly and the sidewall 12 and into piping from the pool skimmer assembly to the pool pump and filter assembly, said water flowing through the holes 33 of the sidewall 12 having been filtered of debris by the sidewall 12.

Figure 2A:
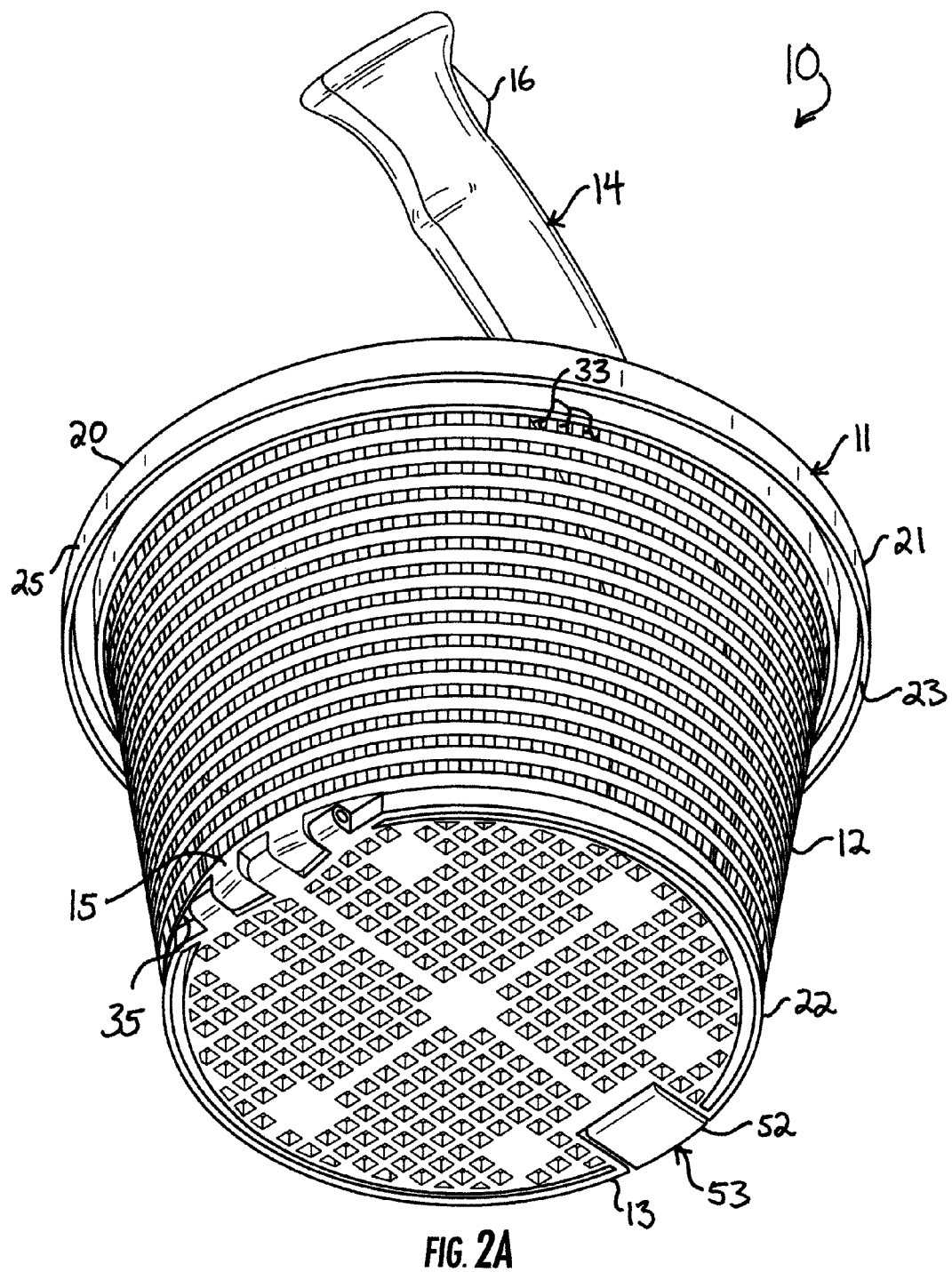
FIG. 2A is a bottom perspective view of the basket apparatus of FIG. 1, showing the bottom in a closed position.
Figure 2B:
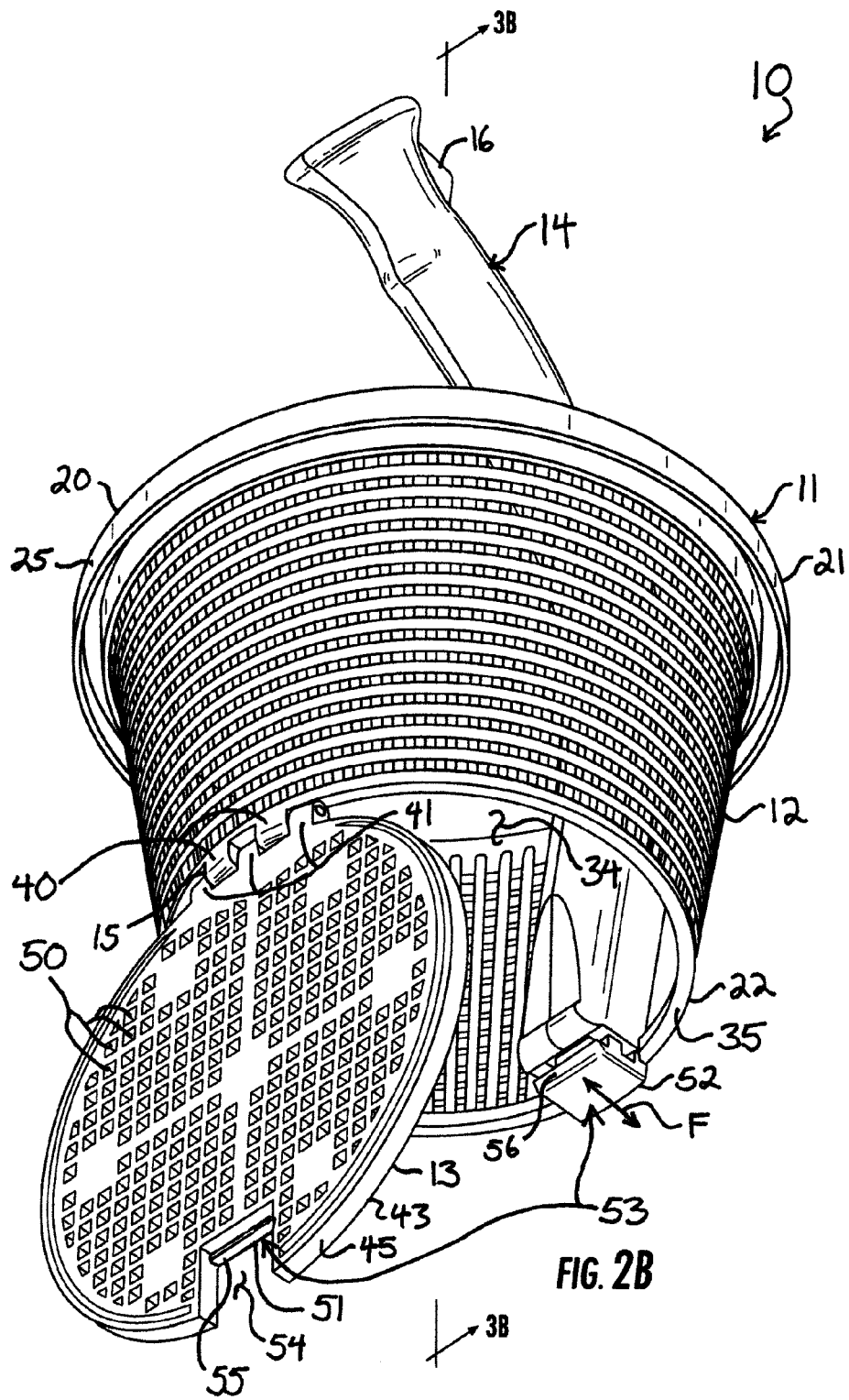
FIG. 2B is a bottom perspective view of the basket apparatus of FIG. 1, showing the bottom in an open position.

The downstream end 22 of the frame 20 can be seen in FIG. 1 as well as in FIGS. 2A and 2B. The downstream end 22 is a solid, annular, rigid ring which has a flat lower surface 35, most clearly seen in FIG. 2B. In other embodiments, the lower surface 35 has a channel formed into the lower surface 35 which receives, in a nesting engagement, an annular tongue formed on the bottom 13 so that the bottom 13 forms a seal against the frame 20. In the embodiment shown in FIG. 2B, the lower surface 35 extends nearly entirely continuously around the downstream end 22 and is disrupted only by the hinge 15. The hinge 15 is carried on both the basket 11 and the bottom 13, with two knuckles 40 projecting integrally from the downstream end 22 of the basket 11 which are enmeshed with three knuckles 41 projecting integrally from the bottom 13. A pin 42 is set through the knuckles 40 and 41, and the knuckles 40 and 41 rotate on the pin 42 to allow the bottom 13 to pivot about the hinge 15.

The bottom 13 of the basket 11 is a flat, monolithic disc or panel pivotally coupled to the downstream end 22 of the basket 11 and corresponding in size to the downstream diameter D of the basket 11. The bottom 13 has an upstream face 43, an opposed downstream face 44, and a circumferential edge 45. The bottom 13 is a filter element and is formed with a plurality of holes 50 extending completely through the bottom 13 from the upstream face 43 to the downstream face 44, allowing the flow of water A to move from the interior 34, through the holes 50, and downstream from the basket apparatus 10, while trapping and collecting debris above the bottom 13. The knuckles 41 project outwardly from the circumferential edge 45 of the bottom 13.

With reference to FIG. 2B, the bottom 13 has a catch 51, which cooperates with a latch 52 to define an engagement assembly 53 for retaining the bottom 13 in the closed position (as shown in FIG. 2A) and releasing the bottom to the open position (as shown in FIG. 2B). The catch 51 is formed in a rectangular inset notch 54 in the bottom 13, and includes a lip 55 proximate to the upstream face 43 and having a thickness less than the distance between the upstream and downstream faces 43 and 44. In other embodiments, the catch 51 is beveled rather than being formed with the lip 55.

While the catch 51 is integral to the bottom 13, the latch 52 is carried on and integral to the basket 11. The latch 52 is a fixture with a projecting lip 56 that engages with the lip 55 on the catch 51 to retain the bottom 13 against the downstream end 22 of the basket 11. The latch 52 moves along the double-arrowed line F in FIG. 2B to engage and disengage with the catch 51. The latch 52 moves forward, toward the interior 34 and toward the hinge 15 to engage with the catch 51, and also moves backward, away from the interior 34 and away from the hinge 15 to disengage with the catch 51. The engagement assembly 53 is diametrically opposed from the hinge 15 on the downstream end 22.

Figure 3A:
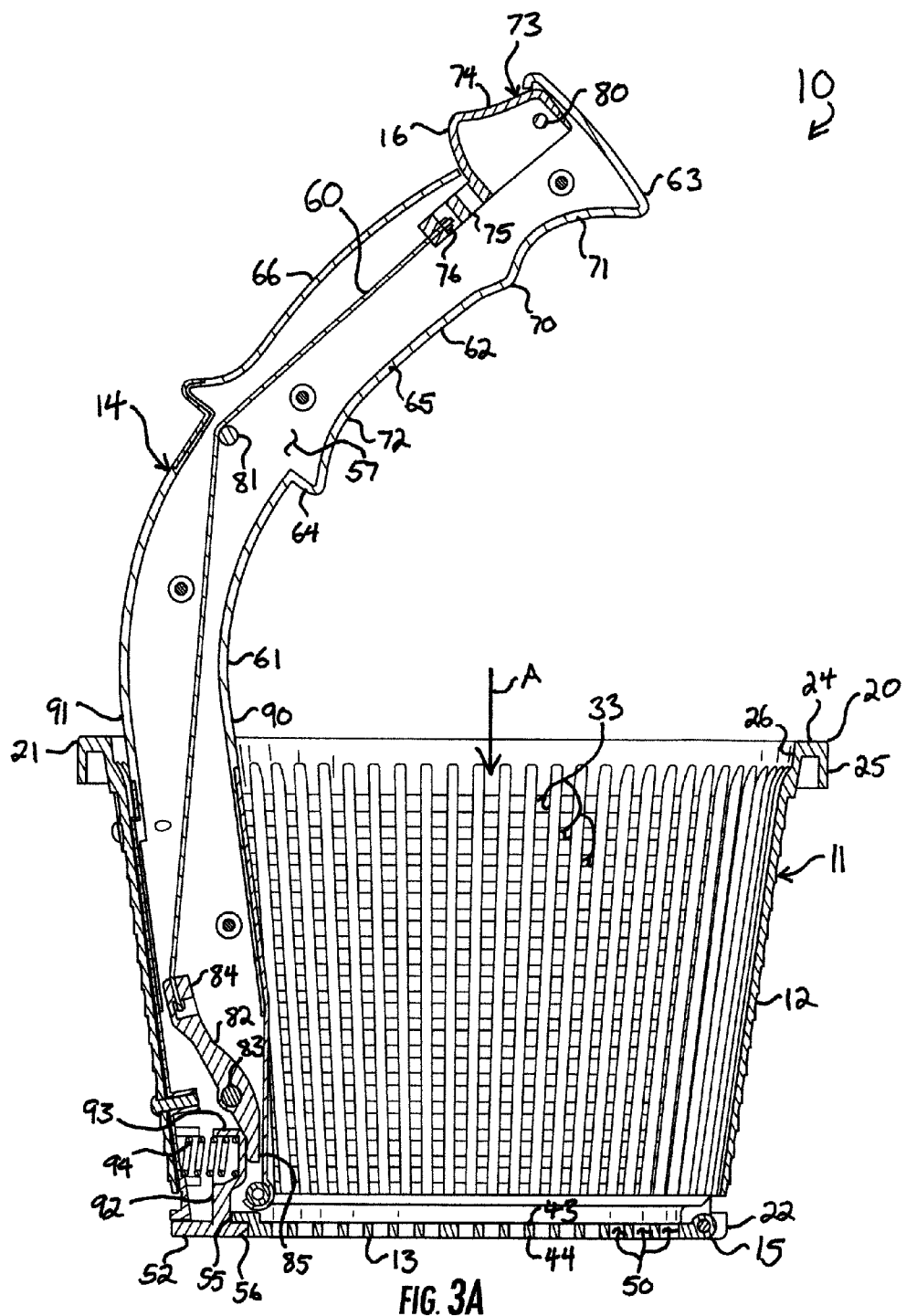
FIG. 3A is a section view of the basket apparatus of FIG. 1 taken along the line 3A-3A in FIG. 1, showing the bottom of the basket in the closed position.
Figure 3B:
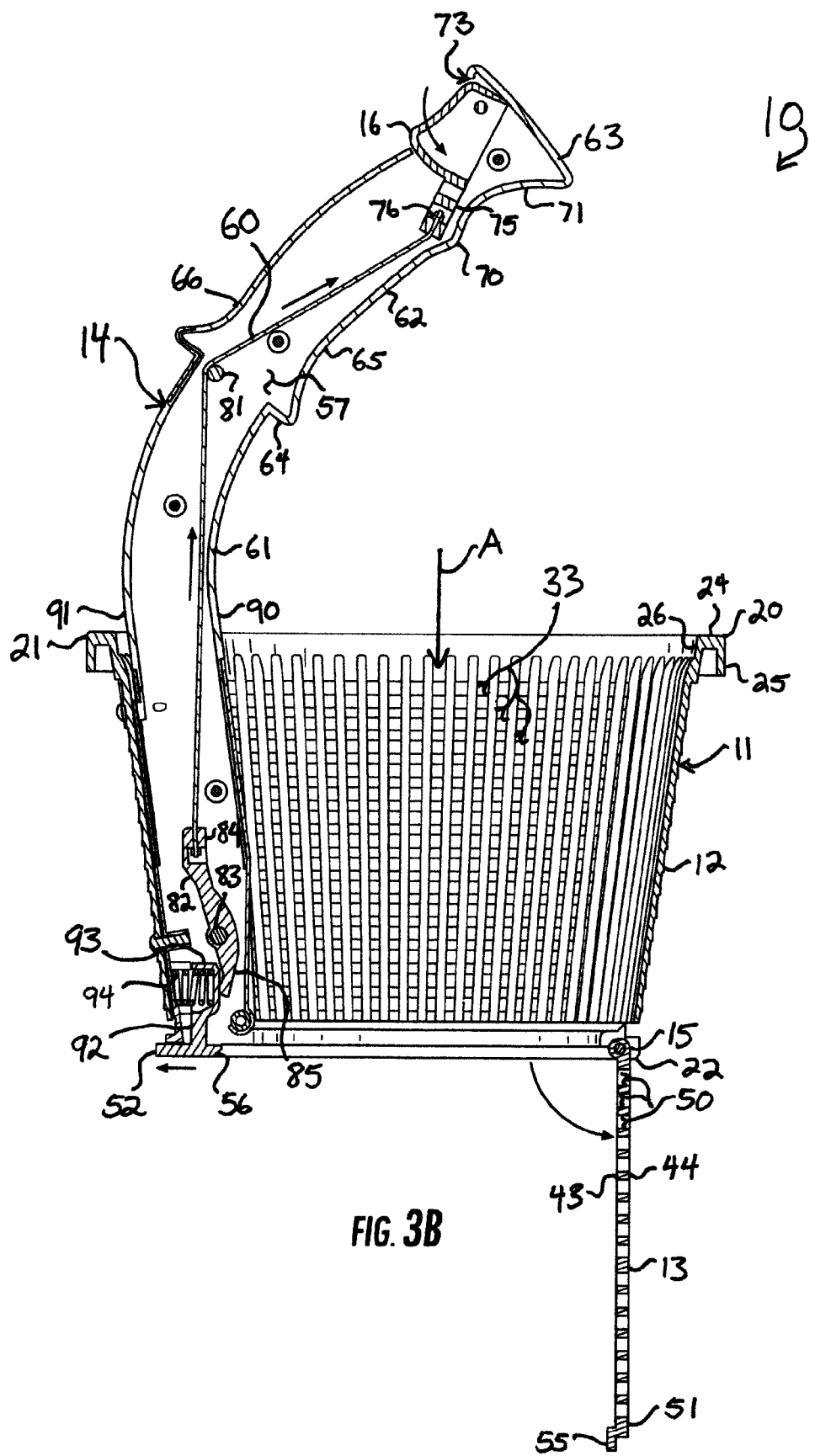
FIG. 3B is a section view of the basket apparatus of FIG. 1 taken along the line 3B-3B in FIG. 2B, showing the bottom of the basket in the open position.

Turning now to FIGS. 3A and 3B, which are section views of the basket apparatus 10 taken along the lines 3A-3A and 3B-3B in FIGS. 1 and 2B, respectively, the latch 52 moves in response to activation of the trigger 16, to which the latch 52 is operatively coupled through a cable 60 extending throughout the handle 14. The handle 14 provides a location for the basket apparatus 10 to be gripped and manipulated, and also houses the structural elements which impart movement to the latch 52 in response to movement or activation of the trigger 16. The handle 14 has two portions: a lower portion, or shaft 61, which is secured to the sidewall 12 of the basket 11, and an upper portion, or grip 62, which is formed to be comfortable when gripped by hand. As seen in FIG. 1, the handle 14 has a solid outer wall along both the shaft 61 and the grip 62, bounding and defining an interior 57 of the handle 14 that is entirely enclosed from and impermeable to water.

Referring to FIG. 3A, the grip 62 has a top 63, an opposed bottom 64, and a front 65 and opposed back 66. the top and bottom 64 and 65 are each flared slightly. A ridge 70 on the front 65 of the grip defines an index finger groove 71 above the ridge 70 and a separate, secondary groove 72 below the ridge 70 for an operator's other fingers. A slot 73 is formed in the back of the grip 62, opposite the index finger groove 71, and the trigger 16 is pivotally coupled within the slot 73 to move into and out of the slot 73.

The trigger 16 is a fixture having a body with a concave face 74. Opposite the face 74, the trigger 16 also includes an elongate leg 75 extending away from the body of the trigger 16, which leg 75 is enclosed within the grip 62 and directed downward toward the shaft 61. The trigger 16 is mounted within the grip 62 on a pivot 80 for pivotal movement about the pivot 80 between a rest position, in which the leg 75 is proximate to the back 66 of the grip 62, as shown in FIG. 3A, and a depressed position, in which the trigger 16 is pivoted forward and the leg 75 is disposed into the ridge 70. The cable 60 is securely attached to the leg 75, so that the cable 60 is pulled or relaxed in response to pivoting of the trigger 16. In FIGS. 3A and 3B, the cable 60 is set into the trigger 16 and is anchored in the leg 75 with a washer 76, but in other embodiments, the cable 60 may be glued, tied, or otherwise secured on the leg 75. From the leg 75, the cable 60 extends down the handle 14 to the bottom 64 of the grip 62, where the cable 60 is routed over a pin 81, which acts as a bearing surface for the cable 60. From the pin 81, the cable 60 extends down to a camming element 82 in the shaft 61, proximate to the downstream end 22 of the basket 11. The cable 60 is taught between the trigger 16 and the camming element 82.

The shaft 61 has a front 90 and back 91, and the camming element 82 is mounted between the front 90 and back 91. The back 91 of the shaft 61 is secured to the sidewall 12 such as with rivets, screws, or other fasteners. The camming element 82 is an elongate body mounted on a pivot 83 within the shaft 61, and the camming element 82 has an upper end 84 above the pivot and a lower end 85 below the pivot 83. When the trigger 16 is in the rest position, the upper end 84 of the camming element 82 is disposed proximate to the back 91 of the shaft 61, and the lower end 85 of the camming element 82 is disposed proximate to the front 90 of the shaft 61, as shown in FIG. 3A. Depressing the trigger 16, as in FIG. 3B, causes the leg 75 to move forward into the ridge 70, retracting, or pulling, the cable 60 upward, and pulling the upper end 84 of the camming element 82 up, causing the camming element 82 to rotate about the pivot 83 and move both the upper and lower ends 84 and 85 to generally intermediate locations between the front and back 90 and 91 of the shaft 61. Releasing the trigger 16 causes the trigger 16 and the camming element to return to their respective positions as shown in FIG. 3A.

The lower end 85 of the camming element 82 is in sliding contact with a portion of the latch 52, so that the camming element 82 and latch 52 are coupled to impart movement to each other. As the camming element 82 pivots, the lower end 85 moves in sliding contact against the latch 52, the latch 52 acting as a bearing surface for the lower end 85. While the latch 52 has a lip 56 which engages with the bottom 15 on the exterior of the basket apparatus 10, the latch 52 also includes an upstanding arm 92 within the shaft 61 formed with a socket 93. The arm 92 is a short projection extending above the lip 56 and terminates in the socket 93 which is concave and directed toward the back 91 of the shaft 61. The socket 93 retains a helical spring 94 compressed between the latch 52 and the back 91 of the shaft 61. The spring 94 urges the latch 52 forward into engagement with the catch 51 on the bottom 15, and also urges the lower end 85 toward the front 90 of the shaft 61, biasing the trigger 16 into the rest position thereof. When the trigger 16 is depressed, it is depressed with sufficient force to overcome the forward force of the spring 94 and cause the lower end 85 to move in sliding contact against the socket 93, move the socket 93 toward the back 91 of the shaft 61, and compress the spring 94, as shown in FIG. 3B. As the socket 93 moves toward the back 91 of the shaft 61, so does the lip 56 of the latch 52, thereby disengaging with the lip 55 of the catch 51 to release the bottom 13. Conversely, when the trigger 16 is released, the spring 94 exerts an outward force against the socket 93 on the latch 52, causing the latch 52 to slide forward and imparting pivotal movement to the camming element 92 about the pivot 83, so that the upper end 84 of the camming element 82 moves toward the back 91 of the shaft 61 and pulls the cable 60 downward, causing the trigger 16 to pivot about the pivot 80 and return to the rest position of the trigger 16.

In operation, the basket apparatus 10 is placed into a pool skimmer assembly, disposed just above the piping from the pool skimmer assembly to the pool pump and filter assembly. When the basket apparatus 10 is in the pool skimmer assembly, the bottom 13 is in the closed position, in direct contact continuously against the lower surface 35 of the basket 11. In this arrangement, the bottom 13 is disposed in an interference position in the flow of water A between the upstream and downstream ends 21 and 22 of the frame 20, and the basket 11 is useful for collecting debris from the flow of water A. FIG. 3A shows the basket 11 and the flow of water A, but the skimmer assembly is not shown for clarity. As debris from the pool, such as leaves, twigs, flowers, bugs, and like items, are drawn into the pool skimmer assembly by the vacuum pressure applied to the pool skimmer assembly by the pump, that debris is drawn into and collected in the basket 11. The debris typically will collect first against the upstream face 43 of the bottom 13, and then, as the debris accumulates, will begin to cover the sidewall 12 as well. As more debris is collected within the basket 11, less water can flow through the basket 11, and eventually the basket apparatus 10 must be cleaned of the debris.

To clean the debris from the basket apparatus 10, a pool operator merely needs to reach into the pool skimmer assembly, as by hand, and grab the basket apparatus 10 by the grip 62 in a thumb-up orientation of the hand, so that the operator's thumb is proximate the top 63 of the grip 62 and the operator's pinky finger is proximate to the bottom 64 of the grip 62. The handle 14 extends above the basket 11 by such a distance that the handle 14i is not submerged under water, so that the pool operator keeps his hand dry. The basket apparatus 10 is then lifted up by the pool operator out of the pool skimmer assembly, and is taken above a trash can or area in which the debris can be deposited. Once the basket apparatus 10 is over the trash can, the operator moves his thumb over the trigger 16 and depresses the trigger 16 inward into the grip 62 to the depressed position of the trigger 16. Depressing the trigger 16 pulls the cable 60 upward within the handle 14, and causes the camming element 82 to pivot, moving the lower end 85 into the latch 52 and imparting translational movement to the latch 52 away from the catch 51. The latch 52 moves away from the bottom 13 and clear of the catch 51, releasing the bottom 13, and the weight of the debris in the basket 11 causes the bottom 13 to fall and pivot away from the basket 11 into the open position thereof, so that the downstream end 22 of the basket 11, and the interior 34 is opened. With the downstream end 22 open, the debris is released from the basket 11. Occasionally, the operator may need to gently shake the basket apparatus 10 once or twice to completely remove the debris, as some debris may become lodged in the holes 50. The operator may release the trigger 16 back to the rest position, and the spring 94 will urge the latch 52 forwardly.

When the basket 11 is cleared of debris, the operator simply raises the bottom 13 from the open position to the closed position. The lip 55 of the catch 51 slides against the lip 56 of the latch 52, and as the bottom 13 is pressed back up into the closed position thereof, the lip 55 of the catch 51 pushes the latch 52 backward slightly and moves past the lip 56 of the latch 52. Once the catch 51 is past the latch 52, the spring 94 urges the latch 52 forward to engage with the catch 51 and retain the bottom 13. With the bottom 13 now securely retained in the closed position, the operator returns the basket apparatus 10 to the pool skimmer assembly, and the basket apparatus 10 will continue to collect more debris.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

1. A pool skimmer filter assembly comprising:
    a frame having an upstream end and a downstream end, the frame configured for insertion into a flow of water from the upstream end to the downstream end; and
    a filter element coupled between the upstream and downstream ends of the frame to move between a closed position and an open position of the filter element while remaining attached to the frame.

2. The assembly of claim 1, wherein the filter element is coupled to the downstream end of the frame.

3. The assembly of claim 1, wherein:
    in the closed position of the filter element, the filter element is disposed in an interference position in the flow of water between the upstream and downstream ends of the frame; and
    in the open position of the filter element, the filter element is away from the downstream end of the frame and out of the flow of water.

4. The assembly of claim 1, wherein the frame includes an upstanding sidewall bounding an interior and formed with holes in fluid communication with the interior.

5. The assembly of claim 1, wherein:
    the filter element is coupled proximate to the downstream end of the frame; and
    the frame and filter element cooperate to form a basket with an opening proximate to the upstream end of the frame for collecting debris in the flow of water moving into the basket from the upstream end toward the downstream end.

6. The assembly of claim 1, wherein the filter element is pivotally coupled to the frame.

7. The assembly of 6, wherein:
    in the closed position of the filter element, the filter element is in continuous and direct contact with the frame to define a fluid-pervious receptacle; and
    in the open position of the filter element, the filter element is released from continuous and direct contact with the frame.

8. The assembly of claim 1, wherein:
    in the closed position of the filter element, the filter element is in continuous and direct contact with the frame to define a fluid-pervious receptacle;
    in the open position of the filter element, the filter is released from continuous and direct contact with the frame;
    a trigger is operatively coupled to the filter element to hold and release the filter element; and
    the filter element moves from the closed position to the open position in response to activation of the trigger.

9. The assembly of claim 8, further comprising:
    a handle extending upwardly from the frame to above the frame; and
    a trigger located in the handle is operatively coupled to the filter element to release the filter element from the closed position to the open position.

10. A pool skimmer filter assembly for disposition in a flow of water being drawn into a pool filter and pump assembly, the pool skimmer filter assembly comprising:
    a sidewall having opposed upstream and downstream ends;
    a handle extending upwardly from the sidewall;
    a filter element coupled to the sidewall proximate to the downstream end to move between a closed position of the filter element and an open position of the filter element while remaining attached to the sidewall; and
    in the closed position of the filter element, the sidewall and the filter element define a basket for collecting debris from the flow of water.

11. The assembly of claim 10, wherein in the open position of the filter element, the downstream end of the sidewall is opened by the filter element.

12. The assembly of claim 10, wherein in the closed position of the filter element, the basket is against the sidewall and cooperates with the sidewall to define a fluid-pervious receptacle.

13. The assembly of claim 10, wherein the filter element is pivotally coupled to the sidewall.

14. The assembly of claim 10, further comprising:
    a trigger carried in the handle; and
    the trigger is operatively coupled to the filter element to release the filter element from the closed position to the open position.

15. The assembly of claim 14, further comprising:
    a catch carried in the sidewall for engagement with the filter element; and
    activation of the trigger imparts movement of the catch to release the filter element.

16. A pool skimmer filter assembly comprising:
    a basket having a sidewall and a rigid filter element coupled to the sidewall to move between an open position and a closed position while remaining attached to the sidewall;
    a trigger operatively coupled to the filter element to hold the filter element in the closed position and to release the filter element to the open position in response to activation of the trigger;
    an interior of the basket having a downstream end;
    in the closed position of the filter element, the downstream end of the interior of the basket is bound by the filter element; and
    in the open position of the filter element, the downstream end of the interior of the basket is opened by the filter element.

17. The assembly of claim 16, further comprising a handle extending upwardly from the sidewall.

18. The assembly of claim 17, wherein the trigger is carried on the handle.

19. The assembly of claim 16, wherein the filter element is pivotally coupled to the sidewall.

20. The assembly of claim 19, further comprising:
    a catch carried in the sidewall;
    in the closed position of the filter element, the filter element is engaged with the catch; and
    in the open position of the filter element, the filter element is released from the catch.

21. The assembly of claim 20, wherein:
the filter element is coupled to the sidewall at a pivot; and
the pivot is opposed from the catch on the sidewall.

* * * * *